United States Patent
Baimel et al.

(10) Patent No.: US 12,149,068 B2
(45) Date of Patent: Nov. 19, 2024

(54) PHASE-CONTROLLED IGBT BRIDGE TYPE, GTO BRIDGE TYPE, AND HYBRID IGBT/SEMI-PASSIVE, GTO/SEMI-PASSIVE TYPES FAULT CURRENT LIMITERS (FCLS)

(71) Applicants: B.G. NEGEV TECHNOLOGIES AND APPLICATIONS LTD., AT BEN-GURION UNIVERSITY, Beer Sheva (IL); SAMI SHAMOON COLLEGE OF ENGINEERING (R.A.), Beer Sheva (IL)

(72) Inventors: Dmitry Baimel, Beer Sheva (IL); Alon Kuperman, Beer Sheva (IL)

(73) Assignees: B.G. NEGEV TECHNOLOGIES AND APPLICATIONS LTD., AT BEN-GURION UNIVERSITY, Beer Sheva (IL); SAMI SHAMOON COLLEGE OF ENGINEERING (R.A.), Beer Sheva (IL)

( * ) Notice: Subject to any disclaimer, the term of this patent is extended or adjusted under 35 U.S.C. 154(b) by 180 days.

(21) Appl. No.: 18/074,084

(22) Filed: Dec. 2, 2022

(65) Prior Publication Data

US 2023/0104736 A1    Apr. 6, 2023

Related U.S. Application Data

(63) Continuation-in-part of application No. PCT/IL2021/050690, filed on Jun. 9, 2021.
(Continued)

(51) Int. Cl.
*H02H 9/02*          (2006.01)

(52) U.S. Cl.
CPC ................................ *H02H 9/02* (2013.01)

(58) Field of Classification Search
CPC ........... H02H 9/02; H02H 9/021; H02H 9/025
(Continued)

(56) References Cited

U.S. PATENT DOCUMENTS 7,071,659 B1    7/2006   Torrey et al.
10,454,265 B2 * 10/2019   Cao ........................ H01H 83/20

FOREIGN PATENT DOCUMENTS

CN          101034803 A   *   9/2007
CN          201142562 Y   *   10/2008
(Continued)

OTHER PUBLICATIONS

Machine translation of Dou et al. Chinese Patent Document CN 201142562 Y Oct. 2008 (Year: 2008).*
(Continued)

*Primary Examiner* — Kevin J Comber
(74) *Attorney, Agent, or Firm* — SALIWANCHIK, LLOYD & EISENSCHENK

(57) ABSTRACT

The present invention provides topologies of phase-controlled IGBT bridge type and GTO bridge type Fault Current Limiter (FCL), which allow the precise limitation of fault currents to the desired values and can keep these values constant despite variations (dynamic behavior) of the fault currents. According to an embodiment of the invention, the topologies enable to use a phase control approach for optimal firing angles calculation. This control approach can be used in the proposed FCL topologies and other controlled bridge topologies such as SCRs bridge, GTO bridge, and IGBT/IGCT/Mosfet bridge topologies.

9 Claims, 12 Drawing Sheets

Related U.S. Application Data

(60) Provisional application No. 63/036,467, filed on Jun. 9, 2020.

(58) Field of Classification Search
USPC .......................................................... 361/93.9
See application file for complete search history.

(56) References Cited

FOREIGN PATENT DOCUMENTS

| | | | |
|---|---|---|---|
| CN | 102931673 A | * | 2/2013 |
| CN | 105356434 A | | 2/2016 |
| CN | 107086555 A | | 8/2017 |
| CN | 110247385 A | | 9/2019 |

OTHER PUBLICATIONS

Machine translation of Dong et al. Chinese Patent Document CN 102931673 A Feb. 2013 (Year: 2013).*

Machine translation of Fei et al. Chinese Patent Document CN 101034803 A Sep. 2007 (Year: 2007).*

Abramovitz, Alexander and Smedley, Keuye "Survey of Solid State Fault Current Limiters" IEEE Transactions on Power Electronics 27(6): 2770-2782, (Jun. 1, 2012).

Baimel, D., et al., "Full theoretical analysis with simulation-based verification of thyristors-bridge-type SFCL operation modes." Simulation Modelling Practice and Theory, 2019, 94: 349-366.

* cited by examiner

PHASE-CONTROLLED IGBT BRIDGE TYPE, GTO BRIDGE TYPE, AND HYBRID IGBT/SEMI-PASSIVE, GTO/SEMI-PASSIVE TYPES FAULT CURRENT LIMITERS (FCLS)

CROSS-REFERENCE TO A RELATED APPLICATION

This application is a Continuation-In-Part of International Application PCT/IL2021/050690, filed Jun. 9, 2021; which claims priority to U.S. Provisional Application Ser. No. 63/036,467, filed Jun. 9, 2020; which are incorporated herein by reference in their entirety.

FIELD OF THE INVENTION

The present invention relates to the field of current limiters. More particularly, the present invention relates to phase-controlled Insulated-Gate Bipolar Transistor (IGBT) bridge type, Gate Turn-off Thyristor (GTO) bridge type, and hybrid IGBT/semi-passive, and GTO/semi-passive type, and IGBT/Thyristor, and GTO/Thyristor Fault Current Limiters (FCLs).

BACKGROUND OF THE INVENTION

The search for solutions to the power quality issues in modern distribution power networks is becoming more intensive during the last years, due to the increasing number of electronic and sensitive loads, and widespread integration of renewable energy sources and distributed generation. The main power quality problems are harmonics, short circuit currents, and voltage spikes or sags. Harmonics produced by non-linear equipment adversely affect motors, transformers, and long power cables. The problem of harmonics can be treated by using passive or active power filters (APFs). The fault currents are dangerous for the network equipment and loads, and also may cause voltage sags. The voltage spikes and sags may be treated by Dynamic Voltage Restorers (DVRs) and static compensators (STATCOMs), while the fault currents can be eliminated by Circuit Breakers (CBs). However, the response time of CBs is limited. Furthermore, the price of the CBs increases with the amplitude of the fault currents that CB has to trip.

In order to limit fault currents, superconducting Fault Current Limiters (FCLs) may also be used. FCLs can be applied in series with the existing circuit breakers. Due to the fast response time, FCLs can limit short circuit currents to the desired threshold value until the circuit breaker disconnects the damaged line from the rest of the grid. Moreover, implementation of FCLs allows reduction of circuit breakers rated short circuit current and, as a result, price decrease.

The FCLs change their impedance from zero during normal operation to some fixed or varying impedance (depends on the type of FCL) during fault operation. There are a lot of FCL types that are comprised of different components, have different design, etc.

The FCLs can be divided into two main groups-superconducting and non-superconducting. The main advantages of non-superconducting upon superconducting FCLs are smaller size and weight, simpler structure, and lower price. The main disadvantage is higher power losses. The most widespread types of superconducting FCLs are resistive and inductive, superconducting magnetic energy storage (SMES), and bridge-type FCL. The common topologies of non-superconducting FCLs are resistive such as series dynamic braking resistor (SDBR) and bridge type FCLs.

Typically, the bridge for the bridge-type FCLs is comprised of passive (diodes) or active (thyristors, metal-oxide-semiconductor field-effect transistors (MOSFETs), or insulated-gate bipolar transistors (IGBTs)) semiconductors. Conventional or superconducting reactors and/or resistors are placed inside the bridge. The diodes-based bridge type FCLs are cheaper and have simpler control than the thyristors- and transistors-based FCLs. The transistor-based FCLs have the highest flexibility and control resolution that allows limiting the fault current accurately to the desired value.

It is, therefore, an object of the present invention to provide a phase-controlled IGBT bridge type, GTO bridge type Fault Current Limiter (FCL), and bypassed Thyristors bridge which allow the precise limitation of fault currents to the desired values and can keep these values constant despite variations (dynamic behavior) of the fault currents. All these topologies have the same controller, operation principle, and advantages.

Another object of the present invention is to provide hybrid topologies of phase-controlled IGBT/semi-passive and GTO/semi-passive bridge type FCLs with three active and one passive (diode) switches, and IGBT/Thyristor and GTO/Thyristors bridge type FCLs with two bi-directional switches and two thyristor switches. This results in a reduced price of the FCL.

It is yet another object of the present invention to provide a comprehensive analysis of presented FCLs used to optimize their control units.

It is a further object of the present invention to provide a phase control algorithm that implements theoretical equations for optimal firing angles calculation. This control approach can be used in the proposed FCL topologies and other controlled bridge topologies such as SCRs bridge, GTO bridge, and IGBT/IGCT/Mosfet bridge topologies.

Other objects and advantages of the invention will become apparent as the description proceeds.

SUMMARY OF THE INVENTION

An IGBT and GTO bridge type Fault Current Limiters (FCLs) located between a power source and a load, comprising:
- a power circuit, constructed from topology of two bi-directional S1, S4 and two unidirectional fully controlled switches S2, S3, connected in a bridge form and a non-superconducting reactor being installed inside said bridge and having internal resistance $R_{DC}$ with series connected dumping resistor $R_D$, and parallel to bridge connected shunt capacitor $C_{sh}$ and resistor $R_{sh}$; and
- a power circuit, constructed from topology of four bi-directional S1-S4 fully controlled switches connected in a bridge form and a non-superconducting reactor being installed inside said bridge and having internal resistance $R_{DC}$ with series connected dumping resistor $R_D$, and parallel to bridge connected shunt capacitor $C_{sh}$ and resistor $R_{sh}$; and
- a controller with precise phase control circuit for limiting the fault current to the desired value by:
  - calculating turn ON and OFF angles of the switches according to the measured current and voltage and by using the analytical equations presented earlier;
  - converting the calculated turn ON and OFF angles to gating signals; and
  - supplying the gating signals to the switches.

In one aspect, the bidirectional switches allow bypassing the FCL during normal operation by simultaneously turning them on at the beginning of the normal operation and their conducting state is preserved until the normal operation mode ends, such that the current that flows through reactor $L_{DC}$ is zero and the line current flows through switches $S_1$, $S_4$.

In another aspect, the reactor operates in a charging mode, during which the positive or negative current flows through the transmission line, corresponding pair of switches, reactor $L_{DC}$, and the load, where at the end of the charging mode, the reactor is charged to the maximum absolute value of the line current. The dumping resistor $R_D$ allows fast discharging of the $L_{DC}$ reactor after the fault period ends and the normal period starts, so it will be ready for the next fault.

In yet another aspect, the reactor operates in a freewheeling mode following the charging mode, during which the polarity of the voltage drop on the reactor is reversed.

During transition from normal to fault operation mode, the shunt capacitor $C_{sh}$ absorbs undesirable voltage spikes on the IGBT switches due to power line's inductance, while the resistor $R_{sh}$ limits the capacitor's current. Also during transition from fault to normal operation mode, the shunt capacitor $C_{sh}$ absorbs undesirable voltage spikes that are developing on reactor $L_{DC}$ and power line's inductance.

In still another aspect, an IGBT/semi-passive and GTO/semi-passive bridge type Fault Current Limiters (FCLs) located between a power source and a load, comprising:
 a power circuit, constructed from two fully controlled bidirectional switches S1, S4, one fully controlled unidirectional switch S2, and one diode switch S3, connected in a form of bridge. A non-superconducting reactor is installed inside said bridge and having internal resistance $R_{DC}$ with series connected dumping resistor $R_D$, and parallel to bridge connected shunt capacitor $C_{sh}$ and resistor $R_{sh}$; and
 a controller with precise phase control circuit for limiting the fault current to the desired value by:
  calculating turn ON and OFF angles of the switches according to the measured current and voltage and by using the analytical equations presented earlier;
  converting the calculated turn on and off angles to gating signals; and
  supplying the gating signals to the switches.

In still another aspect, an IGBT/thyristor and GTO/thyristor bridge type Fault Current Limiters (FCLs) located between a power source and a load, comprising:
 a power circuit, constructed from two fully controlled bidirectional IGBT or GTO switches S1, S4, and two fully controlled thyristor switches S2,S3 connected in a form of bridge. A non-superconducting reactor is installed inside said bridge and having internal resistance $R_{DC}$ with series connected dumping resistor $R_D$, and parallel to bridge connected shunt capacitor $C_{sh}$ and resistor $R_{sh}$; and
 a controller with precise phase control circuit for limiting the fault current to the desired value by:
  calculating turn ON and OFF angles of the switches according to the measured current and voltage and by using the analytical equations presented earlier;
  converting the calculated turn on and off angles to gating signals; and
  supplying the gating signals to the switches.

According to an embodiment of the invention, the explained topologies can be assembled from Mosfets, or IGCTs or GTO, or Thyristor based switches.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

Figure 1:
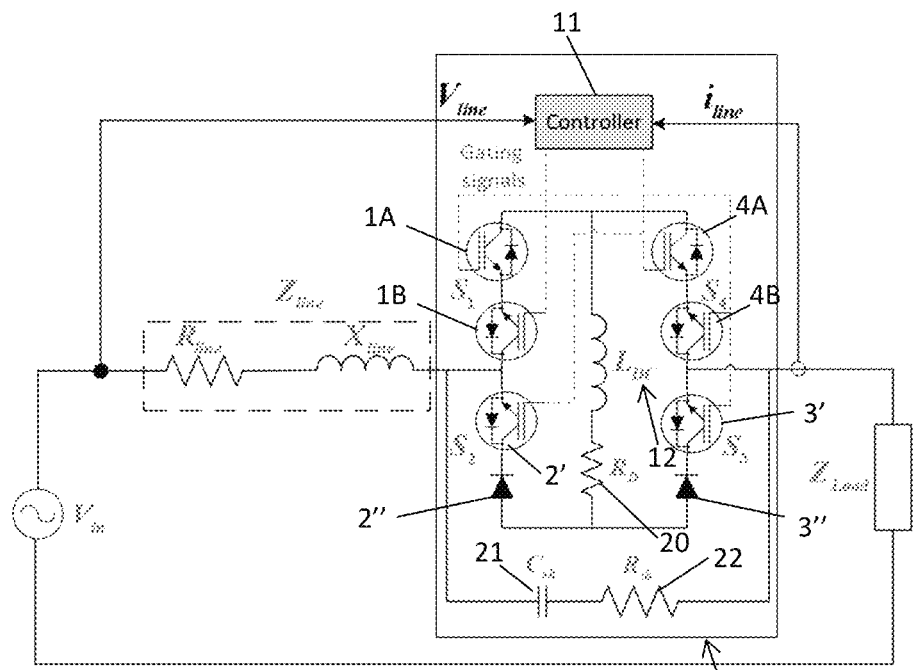
FIG. 1 shows an IGBT bridge type FCL connected in series with the line, according to an embodiment of the present invention.
Figure 2:
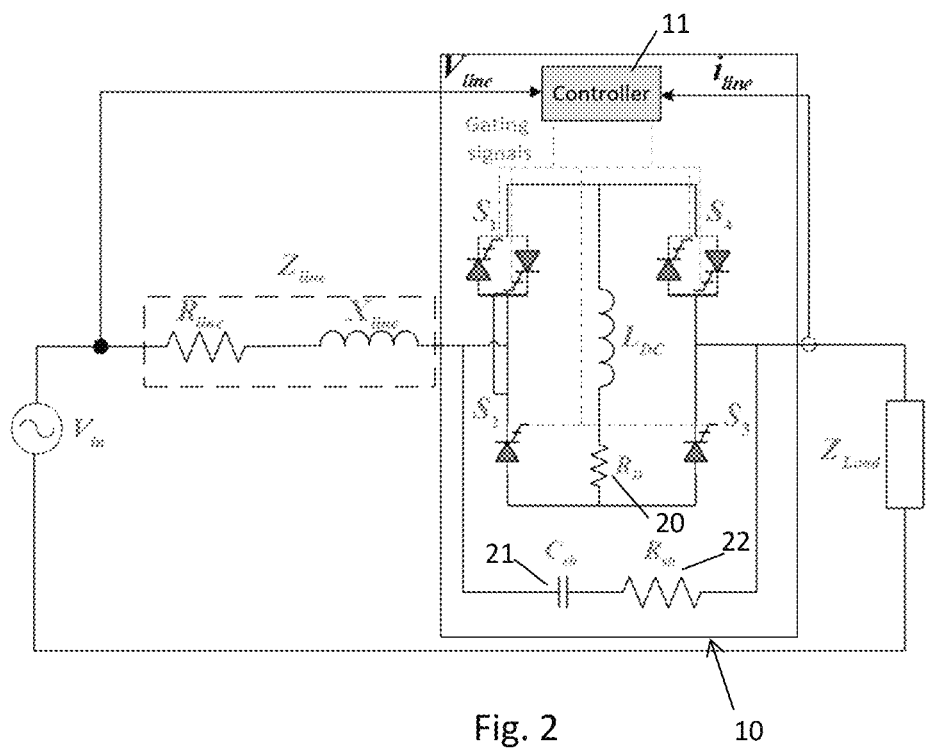
FIG. 2 shows GTO-based bridge-type FCL connected in series with the line, according to an embodiment of the present invention.

The present invention provides phase-controlled IGBT-based and GTO-based bridge-type FCL (see FIG. 1 and FIG. 2). These two topologies are equivalent and have identical operation principles, including operation modes, analytical equations and control. For the convenience, the analytical analysis and all explanations will be provided for IGBT-based topology but all this is identical for the GTO-based topology.

These topologies have two significant advantages over existing FCL topologies. The first advantage of this topology is a precise limitation of the fault currents to the desired values. Furthermore, the proposed FCL can keep the value of the limited fault current constant despite the dynamic behavior of the fault current. The second advantage is reduced power losses (almost zero) during normal operation. This is due to bypassing of the reactor by bi-directional switches S1, S4 during normal operation. Therefore, the only power losses that FCL has during normal operation, may develop on internal conduction resistance of the IGBTs ($R_{DS\_ON}$). This resistance is very small, so that the power losses are negligible.

The present invention also provides a theoretical analysis of the proposed FCL, for normal and fault operation modes, under continuous and discontinuous conduction modes. The analysis covered a wide range of all possible turn-on and turn-off angles.

The phase-control unit uses the presented analytical equations to calculate optimal turn-on and turn-off angles of the switches.

The supply $V_{in}(t)=\sqrt{2}V_m \sin \omega t$ feeds the circuit. According to an embodiment of the invention, an FCL 10 consists of a power circuit and a controller 11 (the controller may interchangeably refer herein also as a control unit). The power circuit comprises a reactor $L_{DC}$ (indicated by numeral 12), dumping resistor $R_D$ (21), two bi-directional switches S1, S4 (e.g., each bi-directional switch is constructed by a pair of series back-to-back connected IGBTs with parallel diodes, as by 1A, 1B for S1 and by 4A, 4B for S4), two unidirectional switches S2, S3 comprised of IGBT 2', 3' series-connected diode S2", S3", correspondingly and shunt capacitor (22) and shunt resistor (23). Controller 11 receives measured line voltage and current, calculates the turn-on and turn-off angles, and generates firing signals for IGBTs. The parameters of the simulated system are summarized in Table 1 below.

TABLE 1

System parameter values used in accompanying simulations

| Parameter | Value | Units |
|---|---|---|
| Supply voltage, $V_{in}$ | 22 | kV |
| Reactance, $L_{DC}$ | 40 | mH |
| Reactor resistance, $R_{DC}$ | 0.1 | Ω |
| Dumping resistance, $R_D$ | 0.5 | Ω |
| Line impedance, $Z_{line}$ | 0 | Ω |
| Base frequency, ω | 100π | rad/s |
| Load impedance, $Z_{Load}$ | 100 + jπ | Ω |
| IGBT forward voltage drop, $V_{TF}$ | 1 | V |
| Shunt capacitance, $C_{sh}$ | 10 | uF |
| Shunt resistance, $R_{sh}$ | 10 | Ω |

Normal Operation Analysis

Figure 3:
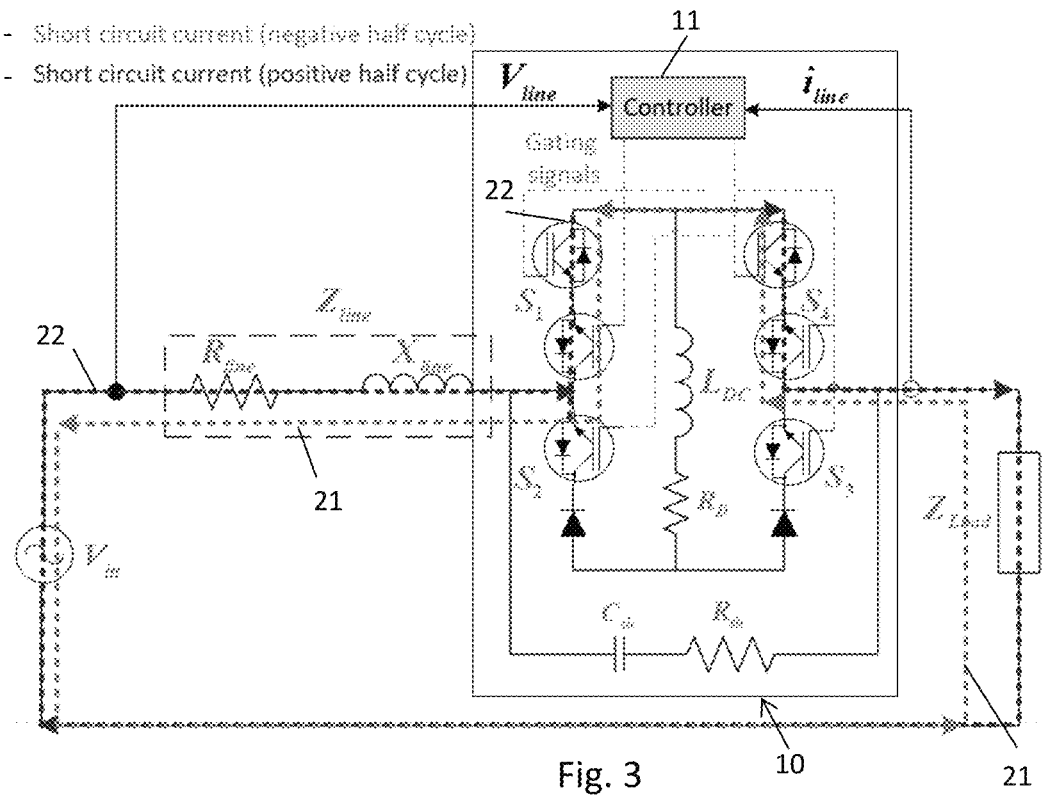
FIG. 3 shows the IGBT bridge type FCL of FIG. 1 bypassed by turning on two bi-directional switches $S_1$ and $S_4$, normal operation, according to an embodiment of the present invention.

The FCL 10 should not affect the power system during the normal operation, i.e., when the line currents are below maximum allowable values that are defined by the parameters of the power system. The use of bi-directional IGBT switches allows bypassing the FCL 10 during normal operation, so that the power system operates as if there is no FCL 10 in the power line. In this case, for linear loads, the obtained line currents will be continuous and sinusoidal. In order to bypass the FCL 10, two bi-directional switches are simultaneously turned on at the beginning of the normal operation, and their conducting state is preserved until the normal operation mode ends. As a result, the current that flows through the reactor $L_{DC}$ is zero, and the line current that enters, flows through switches $S_1$, $S_4$ (as shown in FIG. 3).

The voltages of the power system presented in FIG. 1 during normal operation can be described by the following equation 1:

$$V_{in} = (R_{line} + R_{Load})i_{load} + (L_{line} + L_{Load})\frac{di_{load}}{dt} + 2V_{SF}, \quad (1)$$

where $V_{SF}$ is the voltage drop across the bi-directional switch. FIG. 3 shows that one IGBT and one parallel reversed diode are conducting during the conduction of each bi-directional switch. Therefore, the $V_{SF}$ voltage drop is the sum of IGBT' ($V_{IF}$) and diode' ($V_{DF}$) voltage drops $V_{SF}=V_{IF}+V_{DF}$.

The impedance of the circuit $Z_N$ consists of line and load impedances and can be calculated by $$|Z_N| = \sqrt{(R_{line} + R_{Load})^2 + (X_{line} + X_{Load})^2}, \quad (2)$$

$$\theta_N = tg^{-1}\frac{\omega(L_{line} + L_{Load})}{R_{line} + R_{Load}},$$

where $|Z_N|$ is the modulus and $\theta_N$ is the angle of the circuit impedance.

The line current during normal operation can be calculated by $$i_{line}(t) = \quad (3)$$

$$e^{\frac{-(R_{line}+R_{Load})}{L_{line}+L_{Load}}(t-t_{J.C.})}\left[i_{line(J.C.)} - \frac{\sqrt{2}V}{|Z_N|}\sin(\omega t_{J.C.} - \theta_N) + \frac{2V_{SF}}{R_{line}+R_{Load}}\right]$$

$$+ \frac{\sqrt{2}V}{|Z_N|}\sin(\omega t - \theta_N) - \frac{2V_{SF}}{R_{line}+R_{Load}},$$

where $i_{line(I.C.)}$ is the initial condition of the line current and $t_{(I.C.)}$ is the initial condition time point.

Figure 4:
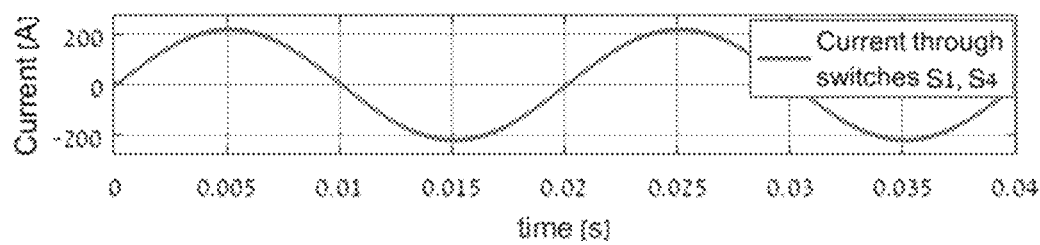
FIG. 4 shows a graph of simulated current flowing through bi-directional switches $S_1$, $S_4$ of FIG. 3, which acts as the line current (normal operation)

FIG. 4 shows simulated line and bypass currents. In the presented case, the initial conditions are zero.

Fault Operation Analysis

Figure 5:
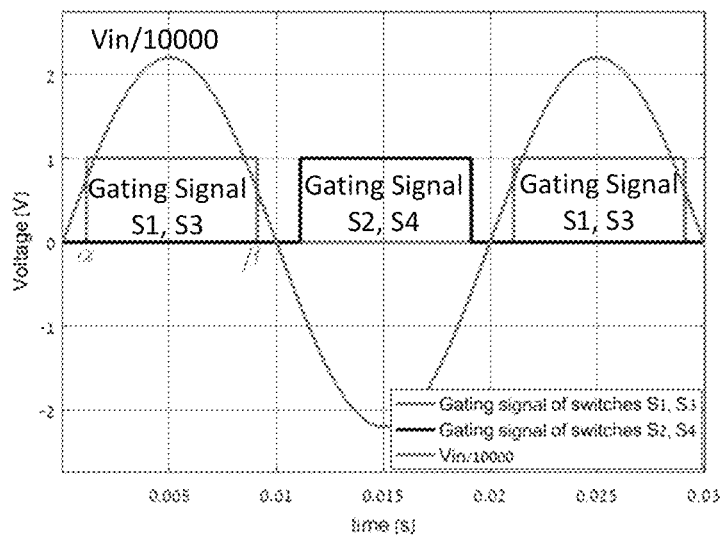
FIG. 5 shows a graph of an example of gating signal, where α is turn on angle and β is turn off angle.

The main purpose of the FCL is to limit fault currents during fault operation, when the line current exceeds its maximum allowable value, for example, during short-circuit currents. When short-circuit currents occur in the power system shown in FIG. 1, the load impedance is in parallel with the short circuit impedance $Z_F = R_F \, j\omega L_F$. The IGBT bridge type FCL can limit short-circuit currents by the $L_{DC}$ reactor impedance, and by controlling the IGBTs' gating signals. The controller defines turn on angle $\alpha$ and turn off angle $\beta$ of the IGBTs' gating signals, which are synchronized to the line voltage. FIG. 5 shows an example of a gating signal.

There are several possible ranges of turn-on and turn-off angles. Different ranges may result in different waveforms, amplitudes, and conduction modes (continuous conduction mode (CCM) and Discontinuous Conduction Mode (DCM). All possible ranges are thoroughly discussed and analyzed hereinafter.

$0 < \alpha < 180°; \alpha < \beta < \alpha + 180° - \text{DCM}$      A.

Figure 6A:
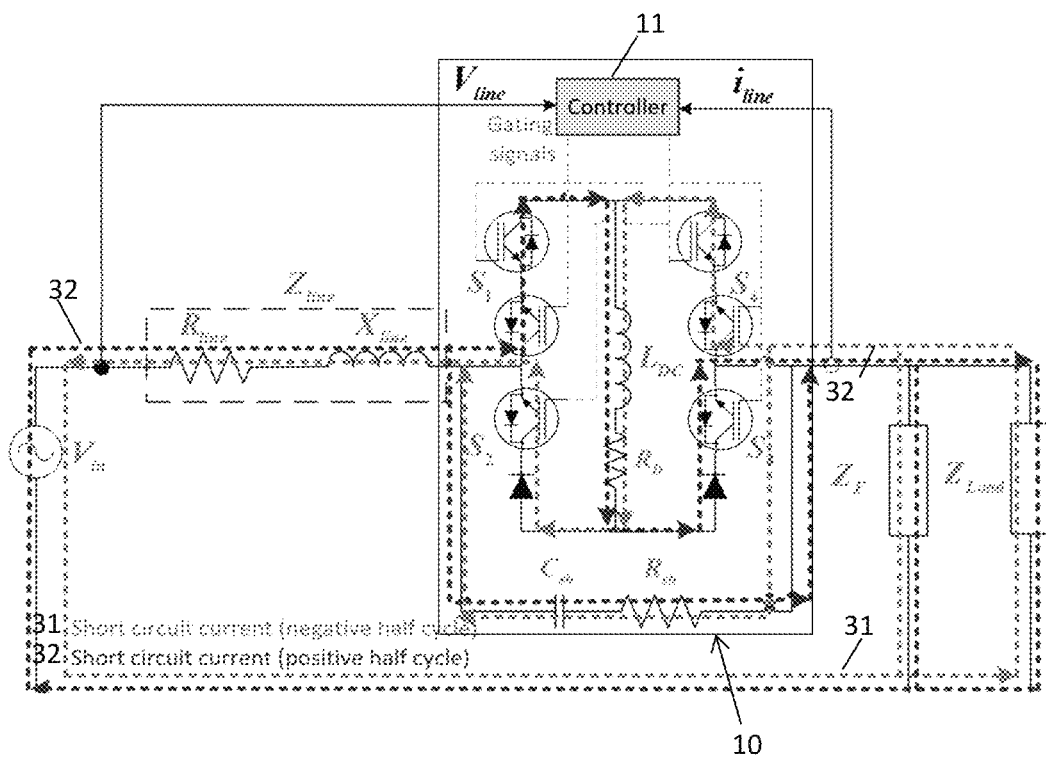
FIG. 6A shows the path of bridge and capacitor currents during positive and negative half-cycles during fault operation, according to an embodiment of the present invention.

For this range of turn-on and turn-off angles, the FCL 10 operates in DCM. Switches $S_1$, $S_3$ are conducting during a positive half-cycle (the path of the line current in the positive half-cycle is indicated by the dotted lines 22 in FIG. 3) and switches $S_2$, $S_4$ are conducting during a negative half-cycle (the path of the line current in the negative half-cycle is indicated by the dotted lines 21 in FIG. 3). FIG. 6A shows the path of the currents during positive and negative half-cycles, which is flows through the line impedance, corresponding pair of bi-directional switches, reactor $L_{DC}$, shunt capacitor and resistor, and fault impedance $Z_F$, in parallel with the load. In this figure, the path of the line current in the positive half-cycle is indicated by the dotted lines 32, and the path of the line current in the negative half-cycle is indicated by the dotted lines 31.

Figure 6B:
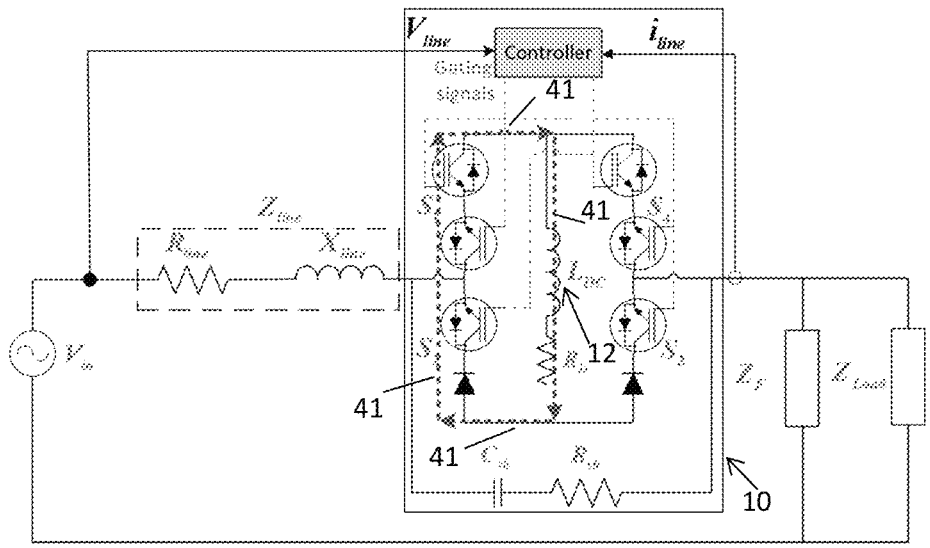
FIG. 6B shows the reactor is short-circuited by turning switches $S_1$, $S_2$ when the line current is zero, according to an embodiment of the present invention.

During each half period, when the corresponding pair of the bi-directional switches are turned off at angle $\beta$, the line current falls to zero and remains zero until the other pair of switches is turned on in the following half-cycle. In order to avoid the abrupt disconnection of the reactor that will result in a high voltage spike across the reactor, according to $$V_L = L\frac{di}{dt},$$

reactor 12 should be short-circuited during the period when the line current is zero. Reactor 12 is short-circuited by turning switches $S_1$, $S_2$ on, as shown in FIG. 6B and as indicated by the path formed by dotted line 41.

Figure 7:
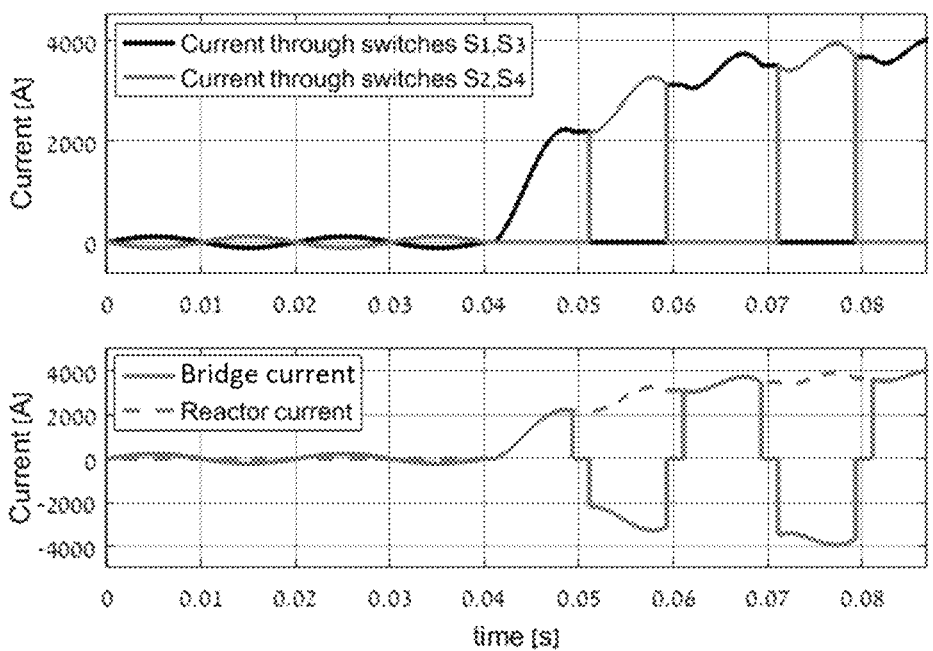
FIG. 7 shows a graph of simulated current through the switches, reactor and bridge; The fault operation mode begins at 0.04 s; α=20° and β=168°.

FIG. 7 shows a simulation example where normal operation mode ends, and fault operation mode begins at time point 0.04 s. During the fault operation mode, the turn-on angle of the gating signals is set to $\alpha=20\%$ and turn-off angle is set to $\beta=168°$. When the fault appears, the impedance of the power system changes from $Z_N$ to $Z_{SC}$ that can be described by $$Z_{SC} = R_{line} + jX_{line} + \frac{jX_{L_{DC}} + R_{sh} - jX_{C_{sh}}}{jX_{L_{DC}}(R_{sh} - jX_{C_{sh}})} + \quad (4)$$

-continued $$\frac{(R_F + jX_F)(R_{Load} + jX_{Load})}{(R_F + R_{Load}) + j(X_F + jX_{Load})} = R_{SC} + jX_{SC},$$

where $$|Z_{SC}| = \sqrt{R_{SC}^2 + X_{SC}^2} \text{ and } \theta_{SC} = \arctan\frac{X_{SC}}{R_{SC}}.$$

The resultant short circuit current $i_{SC}$ can be calculated by $$i_{SC}(t) = e^{-\frac{R_{SC}}{X_{SC}/\omega}(t-t_0)}\left[\frac{2V_{SF}}{R_{SC}} - \frac{\sqrt{2}V_m \sin((\omega t_0 - \theta_{SC}))}{|Z_{SC}|}\right] + \quad (5)$$

$$\frac{\sqrt{2}V_m \sin(\omega t - \theta_{SC})}{|Z_{SC}|} - \frac{2V_{SF}}{R_{SC}} + i_{C_{sh}},$$

where $t_0$ is the initial condition time point, i.e., at $t_0$, the corresponding pair of bi-directional switches start conducting and $i_{C_{sh}}$ is the current that flows through shunt capacitor and resistor. The value of $i_{C_{sh}}$ is negligible compared to the bridge current.

Figure 8:
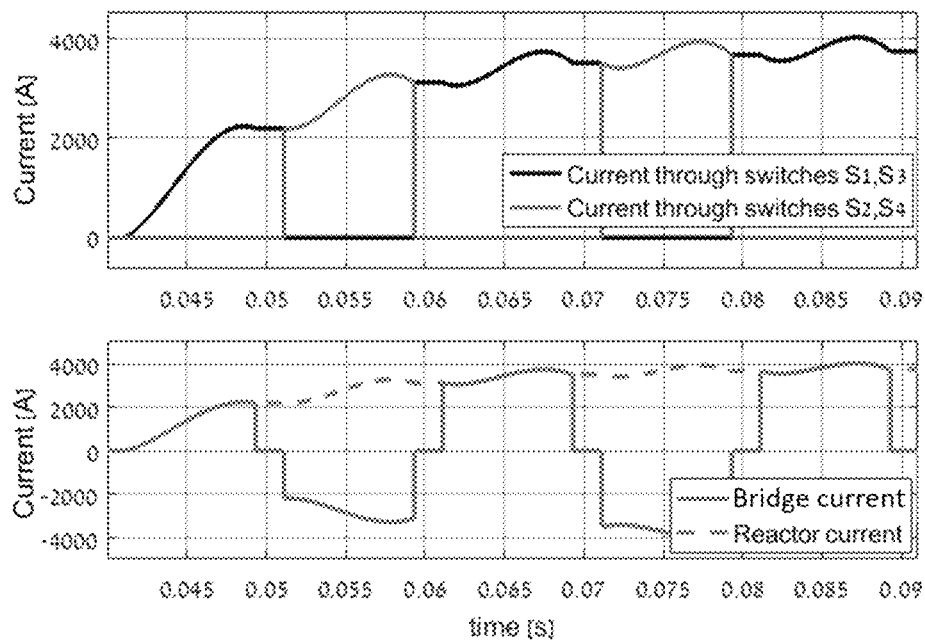
FIG. 8 shows a graph of zoom in on one cycle of the simulated current through the bridge, switches and reactor; The fault operation mode begins at 0.04 s; α=20° and β=168°.

FIG. 8 shows a graph of zoom in on one cycle of the simulated current through the bridge, switches and reactor; The fault operation mode begins at 0.04 s; $\alpha=20°$ and $\beta=168°$.

$0 < \alpha < \alpha'; (\alpha+\pi) < \beta < (\alpha'+\pi) - \text{CCM}$      B.

Figure 9:
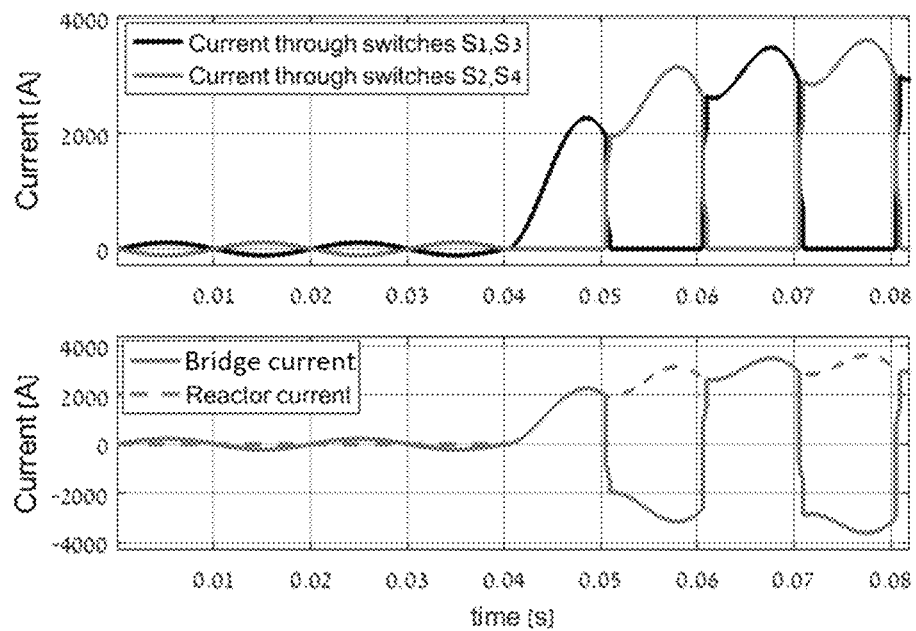
FIG. 9 shows a graph of simulated current through the bridge, switches and reactor and a graph of the fault operation mode begins at 0.04 s; α=10° and β=197°.
Figure 10:
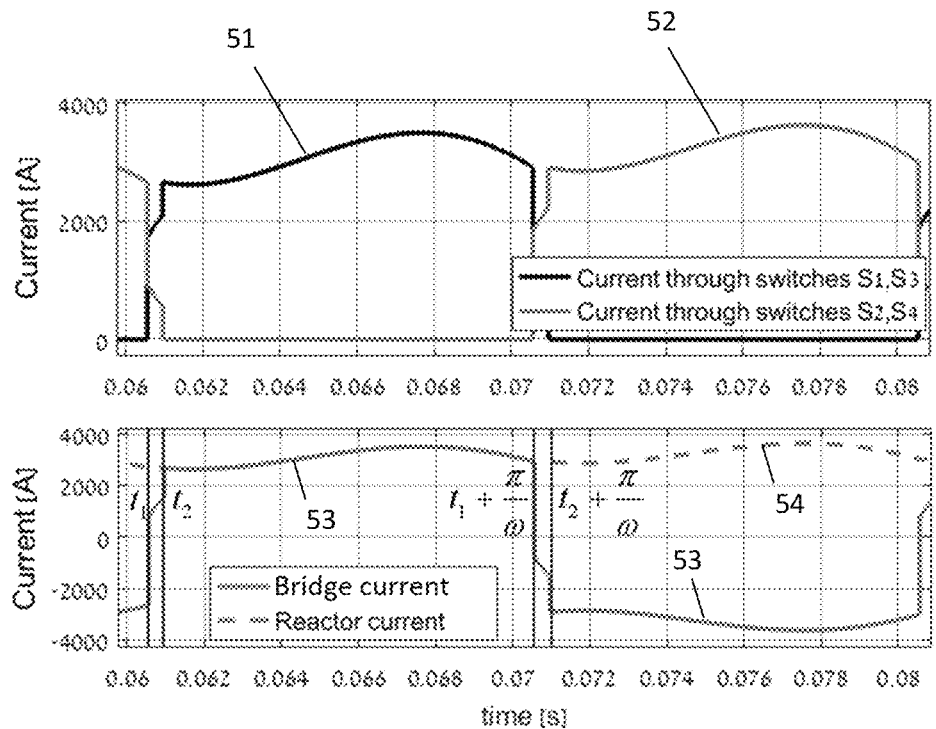
FIG. 10 shows a graph of zoom in on one cycle of the simulated current through the bridge, switches and reactor and a graph of the fault operation mode begins at 0.04 s; α=10° and β=197°.

This range can be divided into two periods. During the first period, the reactor is charged through corresponding pair of switches-charging mode. In the second period, there is an overlapping of two gating signals so that all four switches are conducting-freewheeling mode. These periods are demonstrated in the simulation example shown at FIG. 9, where the short circuit current begins at time point 0.04 s, and the turn-on angle of the gating signals is set to $\alpha=10'$, while the turn-off angle is set to $\beta=197'$. The switches, reactor and short circuit currents zoomed in within one mains cycle are shown in the graphs of FIG. 10. In this figure, the current through switches S1 and S3 is indicated by numeral 51 in the upper graph, and the current through switches S2 and S4 is indicated by numeral 52 in the upper graph. The short circuit bridge current is indicated by numeral 53 in the lower graph, and the reactor current is indicated by numeral 54 in the lower graph.

$$t_2 < t < \left(t_1 + \frac{\pi}{\omega}\right) - \text{reactor charging mode}$$

In this mode, the reactor is charged by the short circuit current. During the positive half-cycle of the short-circuit current, switches $S_1$, $S_3$ are conducting while switches $S_2$, $S_4$ are OFF. During the negative half-cycle, the next charging mode will start at a time point $$t_2 + \frac{\pi}{\omega},$$

where switches $S_2$, $S_4$ are conducting while $S_1$, $S_3$ are OFF. This charging operation mode was already described in FIGS. 6A and B. The short circuit current $i_{SC1\_ch}(t)$ can be described by $$i_{SC1\_ch}(t) = e^{-\frac{R_{SC}}{X_{SC}/\omega}(t-t_2)} \left[ i_{SC1\_ch(I.C.)} - \frac{\sqrt{2} V_m \sin(\omega t_2 - \theta_{SC})}{|Z_{SC}|} + \frac{2V_{SF}}{R_{SC}} \right] + \frac{\sqrt{2} V_m \sin(\omega t - \theta_{SC})}{|Z_{SC}|} - \frac{2V_{SF}}{R_{SC}} + i_{C_{sh}},$$ (6)

where $i_{SC1\_ch(I.C.)}$ is the initial condition of the short-circuit current during charging mode.

$t_1 < t < t_2$—Freewheeling Mode

Figure 11:
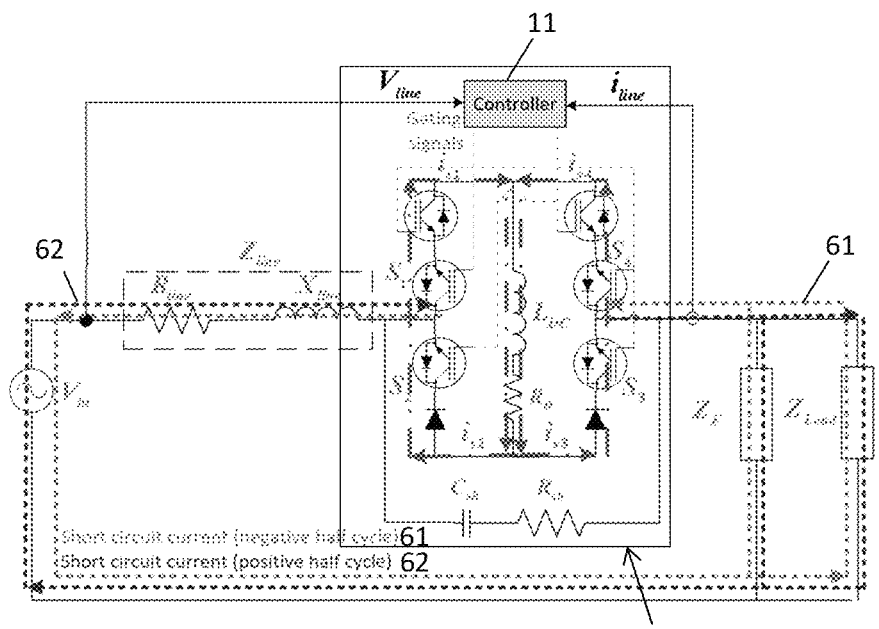
FIG. 11 shows the freewheeling mode during fault current operation, according to an embodiment of the present invention.

FIG. 11 shows the operation principle of the FCL 10 in the freewheeling mode. Due to the overlapping of two gating signals, all four switches S1-S4 are conducting. As a result, previously charged reactor $L_{DC}$ freewheels and discharges through all four switches S1-S4. During this time period, the current through switches $S_1$, $S_3$ increases while the current through switches $S_2$, $S_4$ decreases. The freewheeling mode ends at a time point $t_2$, when the switches $S_2$, $S_4$ are turned off. In this figure, the path of the line current in the positive half-cycle is indicated by the dotted lines 62, the path of the line current in the negative half-cycle is indicated by the dotted lines 61 and the path of the freewheeling current is indicated by the dotted lines 63 as formed by the pattern "-·-".

The total impedance in the freewheeling mode is given by $$Z_{SC1} = R_{line} + jX_{line} + \frac{(R_F + jX_F)(R_{Load} + jX_{Load})}{(R_F + R_{Load}) + j(X_F + jX_{Load})} = R_{SC1} + jX_{SC1},$$ (7)

where $$|Z_{SC1}| = \sqrt{R_{SC1}^2 + X_{SC1}^2} \text{ and } \theta_{SC1} = \arctan\frac{X_{SC1}}{R_{SC_1}}.$$

The short-circuit current $i_{SC1\_fw}(t)$ during the freewheeling mode can be calculated by $$i_{SC1\_fw}(t) = e^{-\frac{R_{SC}}{X_{SC_1}/\omega}(t-t_1)} \left[ i_{SC1\_fw(I.C.)} - \frac{\sqrt{2} V_m \sin(\omega t_1 - \theta_{SC_1})}{|Z_{SC_1}|} \right] + \frac{\sqrt{2} V_m \sin(\omega t - \theta_{SC_1})}{|Z_{SC_1}|},$$ (8)

where $i_{SC1\_fw(I.C.)}$ is the initial condition of the short circuit current during the freewheeling mode. The freewheeling reactor current $i_{LDC}(t)$ is calculated by $$i_{LDC}(t) = i_{SC1\_ch}(t_1) - \frac{2V_{SF}}{L_{DC}} t.$$ (9)

Initial Conditions

The initial condition of the short circuit charging current equals to the reactor current at time point $t_2$, $$i_{SC1\_ch(I.C.)} = i_{SC1\_ch}(t_1) - \frac{2V_{SF}}{L_{DC}} t_2.$$ (10)

Time point $t_2$ can be calculated by the solution of eq. (11)

$$i_{SC1\_ch}(t_1) - \frac{2V_{SF}}{L_{DC}} t_2 = e^{-\frac{R_{SC_1}}{X_{SC_1}/\omega}(t_2-t_1)} \left[ i_{SC1\_fw(I.C.)} - \frac{\sqrt{2} V_m \sin(\omega t_1 - \theta_{SC_1})}{|Z_{SC_1}|} \right] + \frac{\sqrt{2} V_m \sin(\omega t_2 - \theta_{SC_1})}{|Z_{SC_1}|}.$$ (11)

Time point $t_1$ can be calculated by $$t_1 = \frac{\theta_{SC} + \alpha + \pi n}{\omega},$$ (12)

where n is the number of the half cycle of the supply voltage to which the firing angle α is synchronized.

The initial condition of the freewheeling short circuit current $i_{SC1\_fw(I.C.)}$ appears at time point $t_1$ and can be calculated by $$i_{SC1\_fw(I.C.)} = i_{SC1\_fw}(t_1) = e^{-\frac{R_{SC_1}}{X_{SC_1}/\omega}\left(t_1 - \frac{\theta_{SC}+\pi n}{\omega}\right)} \left[ -\frac{\sqrt{2} V_m \sin(\theta_{SC} + \pi n - \theta_{SC_1})}{|Z_{SC_1}|} \right] + \frac{\sqrt{2} V_m \sin(\omega t_1 - \theta_{SC_1})}{|Z_{SC_1}|}.$$ (13)

Calculation of Angle α':

As shown before, if the turn-on angle will be higher than α', the freewheeling mode will not exist, and only charging modes will be present. The angle α' corresponds to time point $t_{\alpha'}$. When α=α', the $|i_{SC1}(t_{\alpha'})|=|i_{SC}(t_{\alpha'})|$. This can be extended to $$\left| e^{-\frac{R_{SC_1}}{X_{SC_1}/\omega}(t_{\alpha'}-t_1)} \left[ i_{SC1\_fw(I.C.)} - \frac{\sqrt{2} V_m \sin(\omega t_1 - \theta_{SC_1})}{|Z_{SC_1}|} \right] + \frac{\sqrt{2} V_m \sin(\omega t_{\alpha'} - \theta_{SC_1})}{|Z_{SC_1}|} \right| = \left| e^{-\frac{R_{SC}}{X_{SC}/\omega}\left(t_1 - t_2 + \frac{\pi}{\omega}\right)} \left[ i_{LDC}(t_{f1}) + \frac{2V_{SF}}{R_{SC}} - \frac{\sqrt{2} V_m \sin\left(\omega\left(t_2 - \frac{\pi}{\omega}\right) - \theta_{sc}\right)}{|Z_{SC}|} \right] + \frac{\sqrt{2} V_m \sin(\omega t_1 - \theta_{SC})}{|Z_{SC}|} - \frac{2V_{SF}}{R_{SC}} \right|.$$ (14)

The value of $t_{\alpha'}$ can be obtained numerically from (14). The angle $\alpha_X$ can be calculated from $$\alpha' = \frac{\pi}{T} t_{\alpha'} + \pi n,$$ (15)

where n is the number of the corresponding half cycle of the main supply voltage.

$0 < \alpha < \alpha'; (\alpha' + \pi) < \beta < (\alpha' + 2\pi)$—CCM

This range can also be divided into charging ($t_1 < t < t_2$) and freewheeling ($t_2 < t < t_1 + \pi/\omega$) periods. The short circuit current during charging operation mode is described by equation (6) and its initial condition by equation (10). However, due to the extended turn-off angle $(\alpha' + \pi) < \beta$, the freewheeling period will be longer than in section B below. As a result, the short-circuit current during freewheeling mode will reach a higher peak value than in previous ranges discussed herein before. This peak value is a function of the turn-off angle $\beta$—a larger turn-off angle will result in a higher short circuit current peak value.

Figure 12:
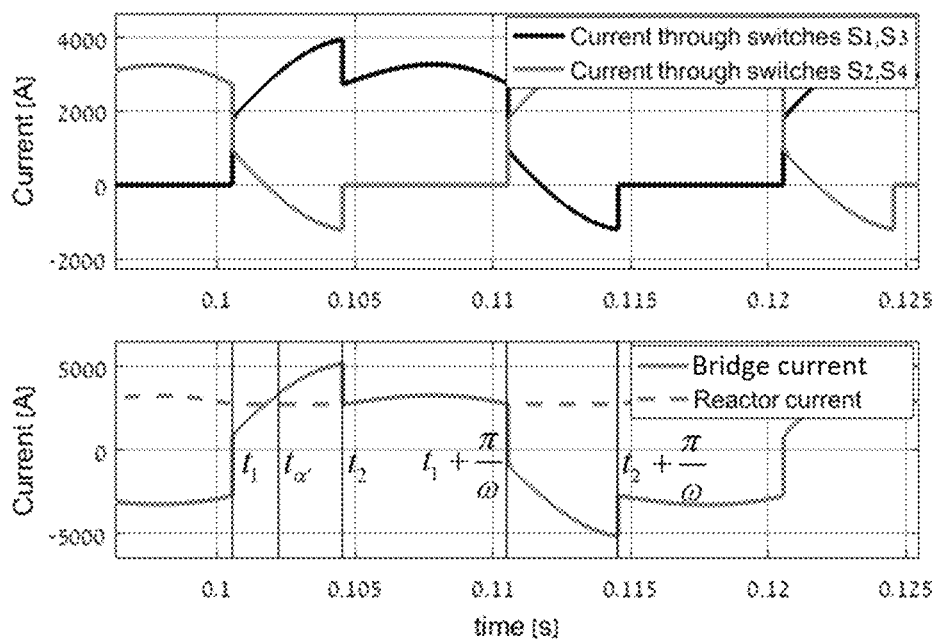
FIG. 12 shows a graph of simulated short circuit current with α=10° and β=262°.

The short-circuit current during freewheeling operation mode is described by equations (7-9) and its initial condition by equation (13). FIG. 12 shows an example of simulated switches and short-circuit current with turn-on angle of the gating signals set to $\alpha = 10°$ and the turn-off angle is set to $\beta = 262°$.

$$\alpha' < \alpha < \alpha_{cr}; (\alpha + \pi) < \beta < (\alpha' + \pi) - \text{CCM} \qquad \text{D.}$$

Figure 13:
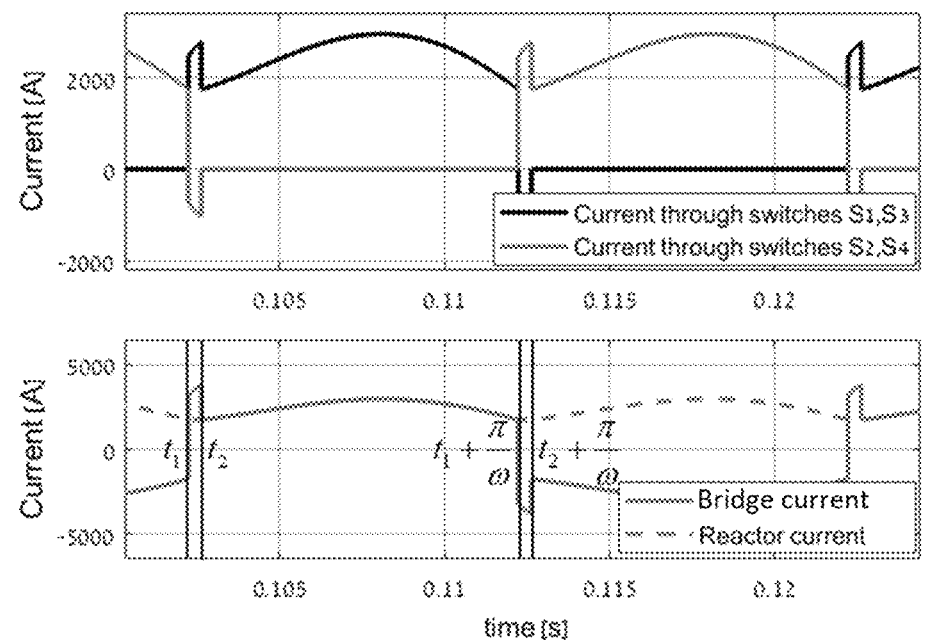
FIG. 13 shows a graph of simulated short circuit current with α=40° and β=227°.

In this range of gating angles, both charging and freewheeling modes are present. FIG. 13 shows an example of simulated switches and short circuit current with turn-on angle of the gating signals set to $\alpha = 40°$ and the turn-off angle is set to $\beta = 227°$.

The freewheeling mode ($t_1 < t < t_2$) begins after time point $t_{\alpha'}$. The length of the freewheeling mode is defined by the value of the turn-off angle $\beta$. Like in the previous case discussed in section B herein above, the peak value of the short circuit current in freewheeling mode is a function of $\beta$. The freewheeling short circuit current can be calculated by (8-9) and its initial condition by equation (13). The short-circuit current in charging mode $$\left(t_2 < t < t_1 + \frac{\pi}{\omega}\right)$$

behaves according to the previously developed equation (6) and its initial condition by equation (10).

$$\alpha_{cr} < \alpha < \pi; \alpha_{cr} < \beta < (\alpha_{cr} + \pi) - \text{DCM} \qquad \text{E.}$$

Figure 14:
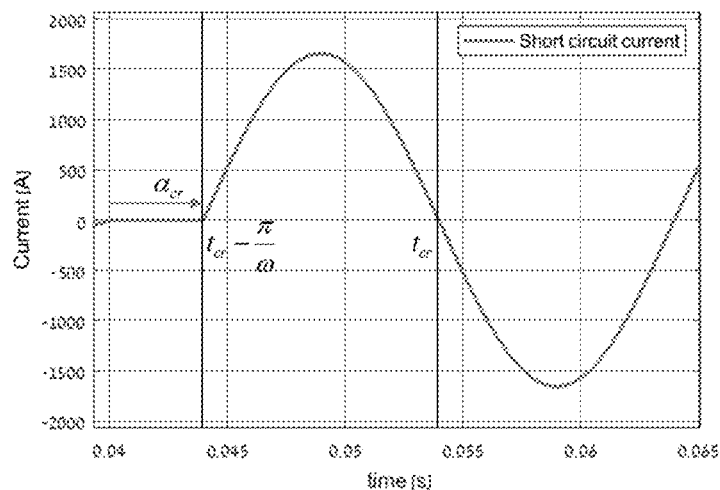
FIG. 14 shows a graph of simulated short circuit current with $α_{cr}$=72° and β=179°.

When the turn-on angle $\alpha$ will be higher than the critical angle $\alpha_{cr}$, the FCL will operate in DCM mode. The example shown in FIG. 14 demonstrates that when IGBTs are turned on at the critical angle of 72°, the short circuit current in charging mode will initially charge the reactor $L_{DC}$ and afterwards, discharge it to zero at a time point $t_{cr}$. The duration of the positive and negative half cycles of the short-circuit current is $\pi$.

The value of $\alpha_{cr}$ can be calculated by $$\alpha_{cr} = \frac{\pi}{T} t_{cr} - \pi n, \qquad (15)$$

where $t_{cr}$ is the time point that corresponds to the angle $\alpha_{cr} + \pi$.

The angle $\alpha_{cr}$ can be calculated from $$i_{SC}(t_{cr}) = e^{-\frac{R_{SC}}{X_{SC}/\omega}(t_{cr}-(t_{cr}-\pi/\omega))} \left[\frac{2V_{SF}}{R_{SC}} - \frac{\sqrt{2} V_m \sin(\alpha_{cr} - \theta_{SC})}{|Z_{SC}|}\right] + \qquad (16)$$

$$\frac{\sqrt{2} V_m \sin(\alpha_{cr} - \theta_{SC})}{|Z_{SC}|} - \frac{2V_{SF}}{R_{SC}} = 0,$$

that is simplified to $$e^{-\frac{R_{SC}}{X_{SC}}\pi} \left[\frac{2V_{SF}}{R_{SC}} - \frac{\sqrt{2} V_m \sin(\alpha_{cr} - \theta_{SC})}{|Z_{SC}|}\right] + \qquad (17)$$

$$\frac{\sqrt{2} V_m \sin(\alpha_{cr} - \theta_{SC})}{|Z_{SC}|} - \frac{2V_{SF}}{R_{SC}} = 0.$$

Figure 15:
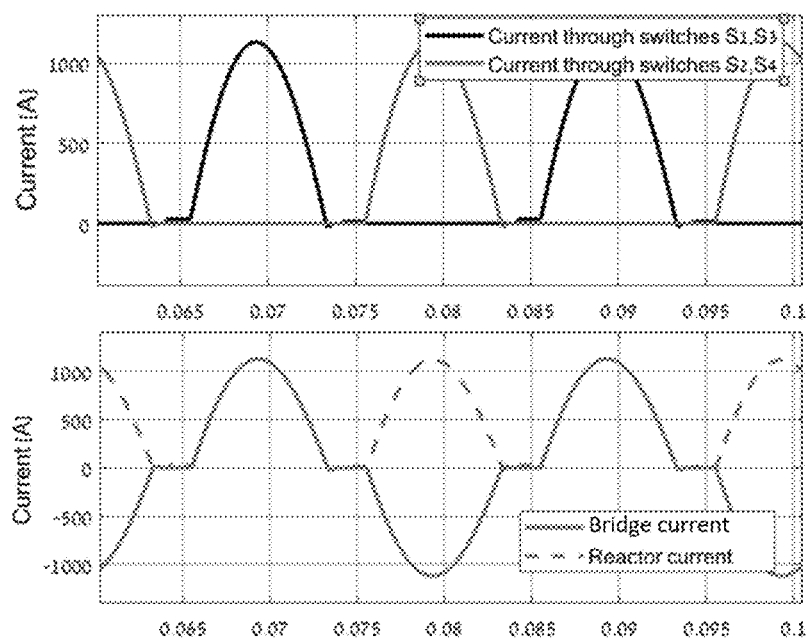
FIG. 15 shows a graph of simulated short circuit current with α=100° and β=255°, α>$α_{cr}$.

FIG. 15 shows an example where IGBTs turn-on angle is higher than the critical angle $\alpha = 100° > \alpha_{cr}$ and IGBTs are turned off long after the short circuit current elapses $\beta = 255°$.

Comparison of the Proposed Phase Control Approach with Existing Solutions

In this chapter, the proposed phase-controlled FCL is compared to other types of non-superconducting FCLs. The comparison focuses on Series Dynamic Braking Resistor (SDBR) and conventional diode bridge type FCLs. The comparison is based on the line current's Root Mean Square (RMS) value because each FCL provides different waveforms of the limited current.

Figure 16A:
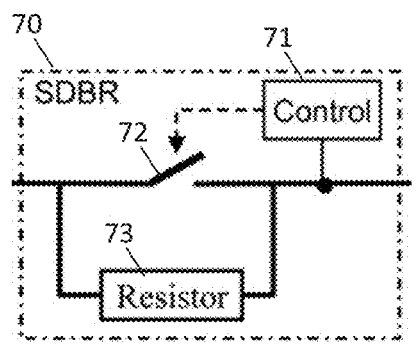
FIG. 16A shows a scheme of SDBR, according to an embodiment of the present invention.

A principal scheme of SDBR 70 is shown in FIG. 16A. According to an embodiment of the invention, SDBR 70 comprises a control 71, a switch 72, and a braking resistor 72. During normal operation, the switch 72 is closed, and the braking resistor 73 is bypassed. During fault operation, the switch 72 is opened, and the braking resistor 73 limits the fault current.

Figure 16B:
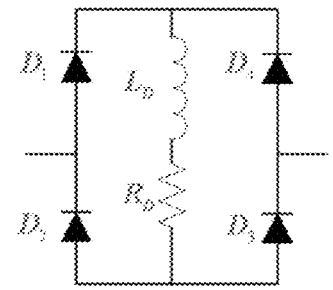
FIG. 16B shows a scheme of standard diode bridge type FCL.

FIG. 16B shows the conventional bridge type FCL, which is comprised of diodes bridge (diodes D1-D4 from the bridge) and inductor $L_d$ with small internal resistance $R_d$. During normal operation, the inductor is charged to the peak value of the line current and does not affect the system except small voltage drop and power losses across the $R_d$ resistance. During fault operation, the fault current is limited by the impedance of the inductor $L_d$.

In order to compare the proposed phase-controlled FCL to SDBR and conventional diode bridge type FCLs, they are simulated under similar conditions-they have similar supply voltage, load, and short circuit impedance. The simulation parameters of the proposed phase-controlled FCL are detailed in Table 1 hereinabove. The diode bridge FCL reactor inductance and resistance are similar to the phase-controlled FCL reactor. The value of the SDBR breaking resistor was chosen to be 2.25Ω in order to ensure similar RMS values of the short circuit current for SDBR and the proposed phase-controlled FCL.

Figure 17:
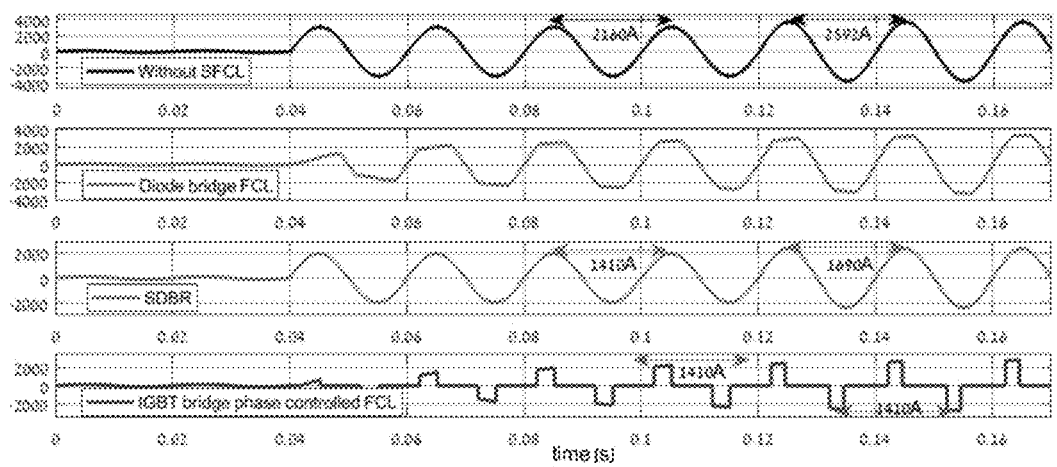
FIG. 17 shows a comparison graph of simulated line currents without FCL, standard diode bridge FCL, SDBR and proposed phase-controlled FCL, under normal and fault conditions.

FIG. 17 shows a comparison of simulated line currents without FCL, standard diode bridge Fa, SDBR, and proposed phase-controlled FCL, under normal and fault conditions. The operation is normal until the time point of 0.04 sec. After 0.04 sec, the fault operation begins.

In modern networks, there is a massive integration of distributed generation and renewable energy sources. The output power of the renewable energy sources depends on varying parameters such as solar irradiance (for PV) and wind speed (for wind turbine). Therefore, the amplitude of the short circuit current may change during the fault state. This issue is also considered in the comparison example—at the time point of 0.12 sec, the fault current increases by 20%.

During the time period between 0.04 sec to 0.12 sec, turn on and off angles of the proposed FCL are set to $\alpha = 40°$, $\beta = 94°$. For these settings, the proposed FCL and SDBR both limit the fault current from 2160 A (RMS) to 1410 A (RMS). The diode bridge FCL limits only the first few cycles of the fault current and afterwards (in the steady-state), while the RMS value of the fault current is 2160 A, similar to the value of the fault current obtained without FCL. After a time point of 0.12 sec, the unlimited short circuit current increases from 2160 A to 2592 A (RMS). As a result, the steady-state fault current of the diode bridge FCL also increases to 2592 A. Because the resistance of the braking resistor is constant (2.25Ω), the RMS value of the SDBR limited fault current jumps from 1410 A to 1690 A. Unlike SDBR and diode bridge FCL, the proposed FCL can keep the limited fault current constant despite the variations in short circuit current. This is achieved by decreasing the turn-off angle to β=83°. The turn-on angle remains unchanged α=40°. Therefore, the proposed FCL is better suited to the dynamic behavior of the fault currents than other conventional types of FCLs.

Figure 18:
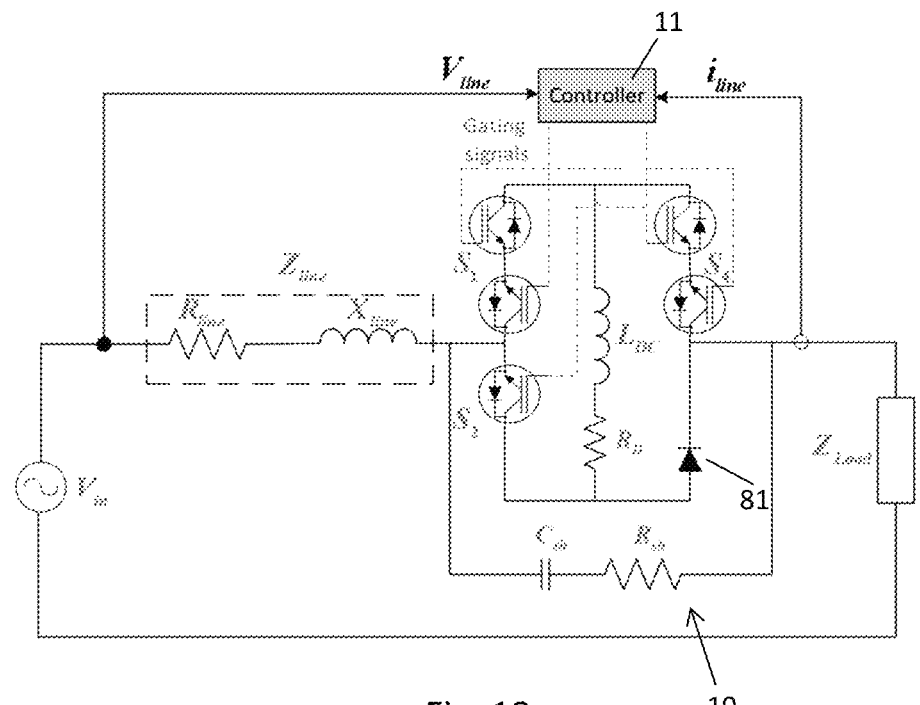
FIG. 18 shows the IGBT/semi-passive FCL topology, according to an embodiment of the present invention.
Figure 19:
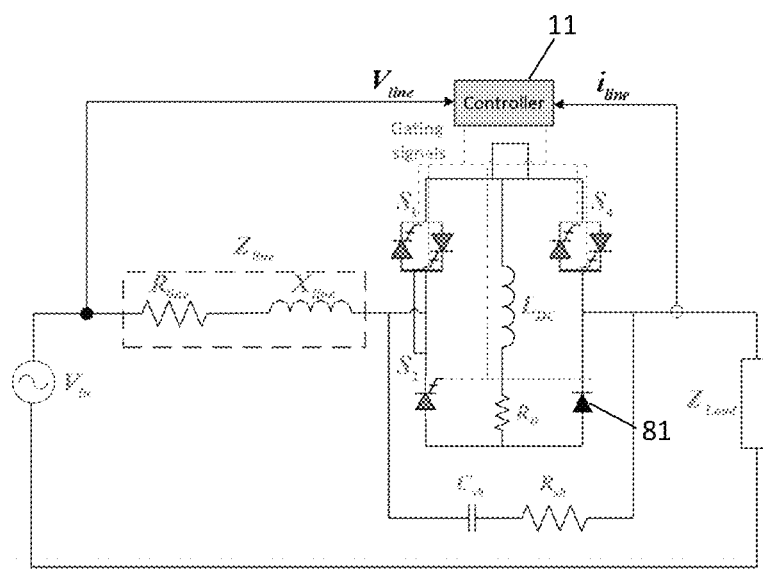
FIG. 19 shows the GTO/semi-passive FCL topology, according to an embodiment of the present invention.

According to some embodiments of the invention, additional two semi-passive FCL topologies are presented in FIGS. 18 and 19. FIG. 18 presents IGBT/semi-passive topology. This topology reminds IGBT topology of FIG. 1. The difference between this topology and the circuit shown in FIG. 1 is the switch S3 that replaced by the diode 81 instead of IGBT in series with diode. The second GTO/semi-passive type topology is presented in FIG. 19.

These two topologies are equivalent and they have the same operation and control principles. The advantage of these two topologies is simpler structure which allows reduction of FCL's price. Their control and operation modes are very similar two IGBT and GTO based topologies shown in FIGS. 1 and 2.

Figure 20:
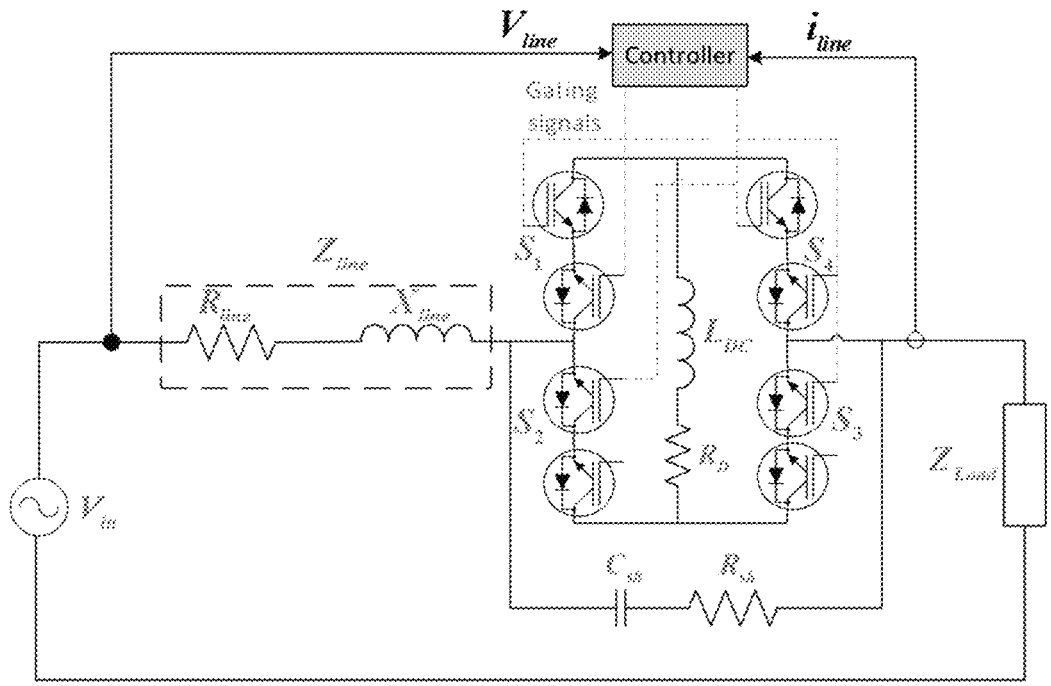
FIG. 20 shows eight IGBTs (four bi-directional switches) bridge type FCL connected in series with the line, according to an embodiment of the present invention.

According to some embodiments of the invention, additional eight IGBTs (four switches) bridge topology is presented in FIG. 20. This topology is almost similar to the topology shown in FIG. 1 with only difference that switches S2 and S3 are also obtained by pair of IGBTs instead of IGBT and diode. The advantages of this topology are higher flexibility of switching and division of normal current into two paths instead of one, which allows reduction of IGBTs nominal voltage rates.

Figure 21:
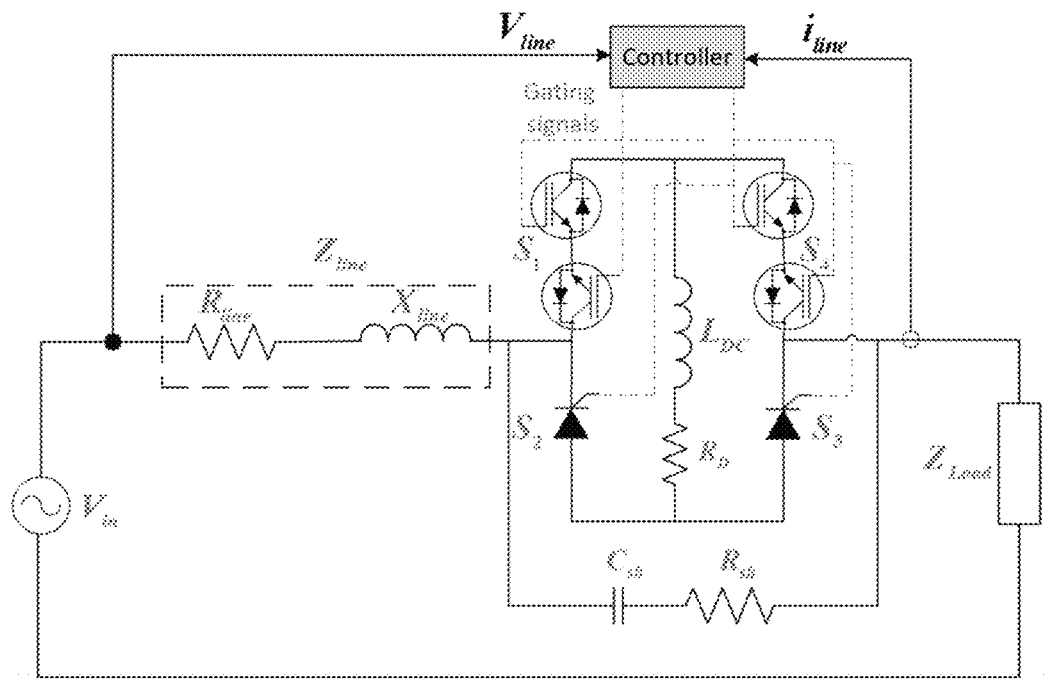
FIG. 21 shows IGBTs/Thyristors bridge type FCL connected in series with the line, according to an embodiment of the present invention.

According to some embodiments of the invention, additional IGBTs/Thyristors bridge topology is presented in FIG. 21. This topology is almost similar to the topology shown in FIG. 1 with only difference that switches S2 and S3 are obtained by thyristors instead of IGBT and diode. The advantage of this topology is the lower price.

Figure 22:
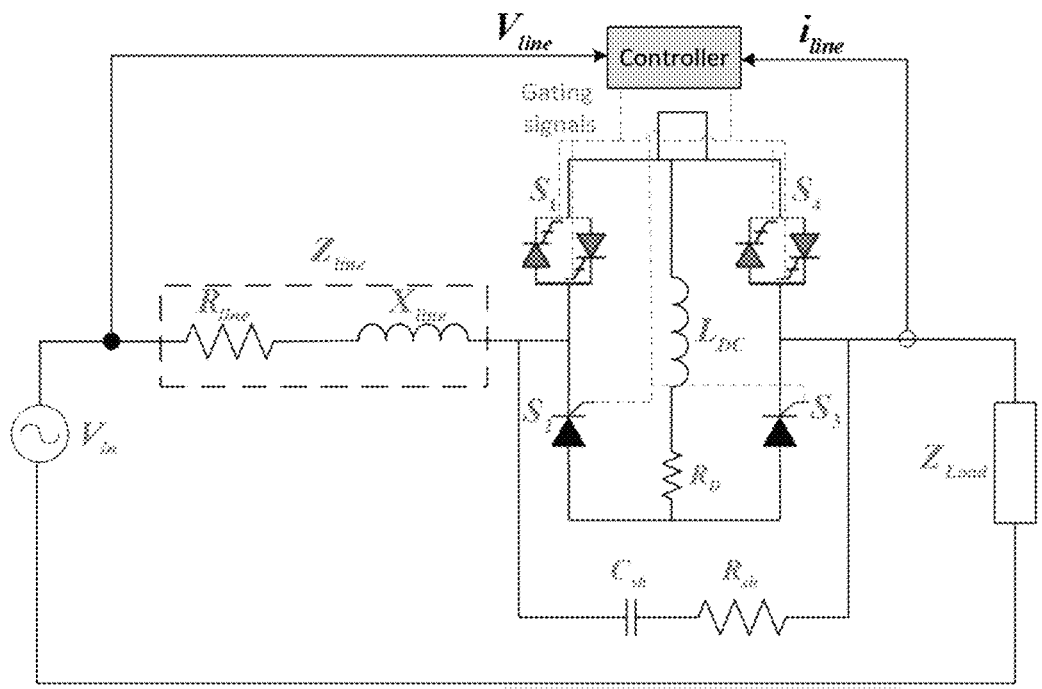
FIG. 22 shows GTOs/Thyristors bridge type FCL connected in series with the line, according to an embodiment of the present invention.

According to some embodiments of the invention, additional GTOs/Thyristors bridge topology is presented in FIG. 22. This topology is almost similar to the topology shown in FIG. 2 with only difference that switches S2 and S3 are obtained by thyristors instead of GTOs. The advantage of this topology is the lower price.

Figure 23:
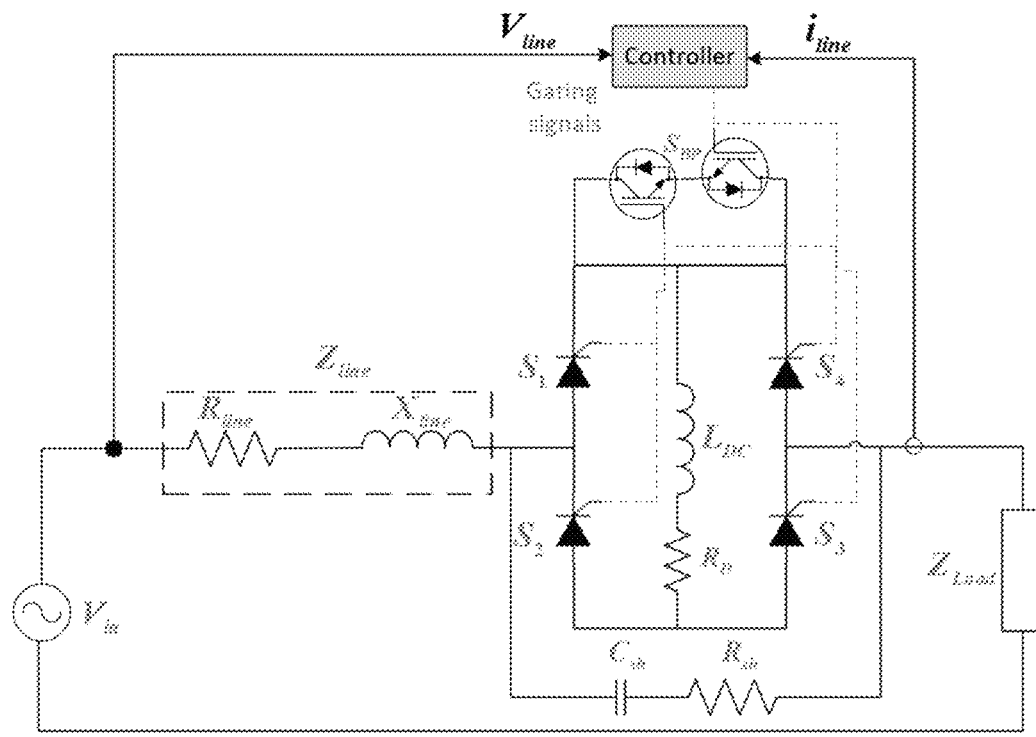
FIG. 23 shows a bypassed thyristors bridge type FCL connected in series with the line, according to an embodiment of the present invention.

According to some embodiments of the invention, additional bypassed thyristors bridge topology is presented in FIG. 23. In this topology, during normal operation, the bridge is bypassed by bi-directional IGBT switch $S_{BP}$. During fault operation, the bypass switch opens and the FCL can operate in operate only on modes B and E. The advantage of this topology is a lower price.

Control Unit

The control unit (i.e., such as control 11 of FIGS. 1 and 2) of the proposed bridge-type FCLs has to be able to detect transition between normal and fault operation modes, to calculate corresponding turn-on and turn-off angles of the IGBTs/GTOs, and to convert these angles into IGBTs/GTOs gating signals. The operation principle of the control unit is described below.

A process of the control unit's algorithm, may involve the followings steps:

1. Input nominal current value $i_{nom}$ (current below this value is considered normal).
2. Input current value limited by FCL $i_{lim\_FCL}$ (the short circuit current will be limited to this value).
3. Measure voltage $V_{line}$ and current $i_{line}$ at the input of FCL. (FCL constantly measures voltage and current at the FCL's terminals, as show in FIG. 1)
4. Check if $i_{line} > i_{nom}$=?{No-Go to step 3.}
   {Yes—
   5. Calculate the rising rate of the current.
   6. Calculate the maximum value of the expected short circuit current.
   7. Calculate turn on and turn off angles α, β that will limit the current to the value
      $i_{lim\_FCL}$. This step is implemented by using previously presented analytical equations.
   8. Generate synchronized gating signals for switches.
   9. Measure current $i_{line}$ at the input of FCL.
   10. Check if $i_{line} > i_{lim\_FCL}$=?{Yes—
       This means that the conditions of fault are changing. Go to step 5.}
       {No—
   11. Check if $i > i_{nom}$=? {Yes—Go to step 9.}
       {No—The short circuit has ended. Go to step 3.}}

As will be appreciated by a person skilled in the art, the presented control unit is used in all presented FCL topologies.

All the above description and examples have been given for the purpose of illustration and are not intended to limit the invention in any way. Many different electronic and logical elements can be employed, all without exceeding the scope of the invention.

The invention claimed is:

1. An IGBT and GTO bridge type Fault Current Limiters (FCLs) located between a power source and a load, comprising:
   a) a power circuit, constructed from topology of two bi-directional S1, S4 and two unidirectional fully controlled switches S2, S3, connected in a bridge form and a non-superconducting reactor being installed inside said bridge and having internal resistance $R_{DC}$ in series with damping resistor $R_D$ and in parallel to a bridge installed shunt capacitor $C_{sh}$ and shunt resistor $R_{sh}$; and
   b) a controller with phase control circuit for limiting fault current to a desired value by:
      b1) calculating turn ON and OFF angles of the switches according to a measured current and voltage;
      b2) converting the calculated turn ON and OFF angles to gating signals; and
      b3) supplying the gating signals to the switches.

2. The IGBT and GTO bridge type fault current limiter (FCL) according to claim 1, in which the reactor operates in a charging mode, during which positive or negative current flows through a transmission line, corresponding pair of switches, reactor $L_{Dc}$, and the load, where at the end of the charging mode, the reactor is charged to a maximum absolute value of a line current.

3. The IGBT and GTO bridge type fault current limiter (FCL) according to claim 1, in which the topology is assembled from Mosfets or IGCTs, or Thyristors based switches.

4. The IGBT and GTO bridge type fault current limiter (FCL) according to claim 1, in which the bidirectional switches allow bypassing said FCL during normal operation by simultaneously turning the bidirectional switches on at the beginning of the normal operation and a conducting state of the bidirectional switches is preserved until the normal operation ends, such that current that flows through reactor $L_{DC}$ is zero and a line current flows through switches $S_1$, $S4$.

5. The IGBT and GTO bridge type Fault Current Limiter (FCL) according to claim 1, in which the reactor operates in a freewheeling mode following a charging mode, during which a polarity of a voltage drop on the reactor is reversed.

6. An IGBT/semi-passive and GTO/semi-passive bridge type Fault Current Limiters (FCLs) located between a power source and a load, comprising:
 a) a power circuit, constructed from two bi-directional fully controlled bidirectional switches S1, S4, one fully controlled unidirectional switch S2, and one diode switch S3, connected in a form of bridge, wherein a non-superconducting reactor is installed inside said bridge and having internal resistance $R_{Dc}$ in series with damping resistor $R_D$ and in parallel to a bridge installed shunt capacitor $C_{sh}$ and shunt resistor $R_{sh}$; and
 b) a controller with phase control circuit for limiting fault current to a desired value by:
  b1) calculating turn ON and OFF angles of the switches according to a measured current and voltage;
  b2) converting the calculated turn on and off angles to gating signals; and
  b3) supplying the gating signals to the switches.

7. The IGBT/semi-passive and GTO/semi-passive bridge type Fault Current Limiters (FCLs) according to claim 6, in which the bidirectional switches allow bypassing said FCL during normal operation by simultaneously turning the bidirectional switches on at the beginning of the normal operation and a conducting state of the bidirectional switches is preserved until the normal operation ends, such that a current that flows through reactor $L_{DC}$ is zero and a line current flows through switches S1, S4.

8. The IGBT/semi-passive and GTO/semi-passive bridge type Fault Current Limiters (FCLs) according to claim 6, in which the reactor operates in a freewheeling mode following a charging mode, during which a polarity of a voltage drop on the reactor is reversed.

9. A thyristors bridge with bypass switch Fault Current Limiters (FCLs) located between a power source and a load, comprising:
 a) a power circuit, constructed from the topology of four thyristors S1-S4 and connected in a bridge form with a bypass switch $S_{BP}$, in parallel, and a non-superconducting reactor being installed inside said bridge and having internal resistance $R_{DC}$ in series with damping resistor $R_D$ and in parallel to a bridge installed shunt capacitor $C_{sh}$ and shunt resistor $R_{sh}$; and
 b) a controller with phase control circuit for limiting fault current to a desired value by:
  b1) calculating turn ON and OFF angles of the switches according to a measured current and voltage;
  b2) converting the calculated turn ON and OFF angles to gating signals; and
  b3) supplying the gating signals to the switches.

\* \* \* \* \*

UNITED STATES PATENT AND TRADEMARK OFFICE
CERTIFICATE OF CORRECTION

PATENT NO.         : 12,149,068 B2
APPLICATION NO.    : 18/074084
DATED              : November 19, 2024
INVENTOR(S)        : Dmitry Baimel and Alon Kuperman It is certified that error appears in the above-identified patent and that said Letters Patent is hereby corrected as shown below:

In the Specification

Column 7,
Line 33, "which is flows through" should read -- which flows through --.

Column 8,
Line 6, "$|Z_{SC}| = \sqrt{R_{SC}^2 + X_{SC}^2}$" should read -- $|Z_{SC}| = \sqrt{R_{SC}^2 + X_{SC}^2}$ --.

Line 13, "$\left[\frac{2V_{SF}}{R_{SC}} - \frac{\sqrt{2}V_m \sin((\omega t_0 - \theta_{SC}))}{|Z_{SC}|}\right] +$" should read -- $\left[\frac{2V_{SF}}{R_{SC}} - \frac{\sqrt{2}V_m \sin(\omega t_0 - \theta_{SC})}{|Z_{SC}|}\right]$ --.

Line 38, "set to α=10'," should read -- set to α=10°, --.
Line 39, "set to β= 197'." should read -- set to β = 197°. --.

Column 9,
Line 35, "$\sqrt{R_{SC1}^2 + X_{SC1}^2}$" should read -- $\sqrt{R_{SC1}^2 + X_{SC1}^2}$ --.

Column 12,
Line 50, "diode bridge Fa," should read -- diode bridge FCL, --.

Signed and Sealed this
Tenth Day of June, 2025

Coke Morgan Stewart
*Acting Director of the United States Patent and Trademark Office*